US008335442B2

(12) United States Patent
Cobene, II

(10) Patent No.: US 8,335,442 B2
(45) Date of Patent: Dec. 18, 2012

(54) HARD IMAGING DEVICES AND HARD IMAGING METHODS

(75) Inventor: Robert Louis Cobene, II, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1326 days.

(21) Appl. No.: 11/700,750

(22) Filed: Jan. 30, 2007

(65) Prior Publication Data

US 2008/0181693 A1 Jul. 31, 2008

(51) Int. Cl.
*G03G 15/00* (2006.01)
*G01N 21/21* (2006.01)

(52) U.S. Cl. .......................................... 399/45; 399/389

(58) Field of Classification Search ..................... 399/45
See application file for complete search history.

(56) References Cited

U.S. PATENT DOCUMENTS 3,807,868 A * 4/1974 Simila ........................... 356/369
5,640,244 A * 6/1997 Hellstrom et al. ............ 356/429
5,729,349 A * 3/1998 Tomita et al. ................. 356/429
5,982,498 A * 11/1999 Byatt et al. .................... 356/429
5,991,588 A * 11/1999 Kraft ............................. 399/297
6,246,860 B1 * 6/2001 Ohmichi ........................ 399/406
6,587,652 B2 * 7/2003 Metzler ........................... 399/45
6,793,307 B2 * 9/2004 Spurr et al. ...................... 347/14
6,853,393 B2 * 2/2005 Akita ............................ 347/129
6,882,804 B2 * 4/2005 Eskey .............................. 399/45
7,072,596 B2 7/2006 Smith et al.
2002/0186416 A1 * 12/2002 Trelewicz et al. ........... 358/3.06
2003/0137679 A1 * 7/2003 Nakazawa et al. ............. 358/1.6
2004/0008244 A1 * 1/2004 Tsujimoto ..................... 347/105

FOREIGN PATENT DOCUMENTS

JP 55026508 A * 2/1980
JP 04102049 A * 4/1992
JP 07311142 A * 11/1995
JP 07311143 A * 11/1995
JP 07311144 A * 11/1995

OTHER PUBLICATIONS

Machine Translation of JP 07311142 A, JPO, Mar. 6, 2011.*
"Properties and Testing of Pulp and Paper" 2nd Edition Handbook for Pulp & Paper Technologies; G. A. Smook; 1992; p. 339.

* cited by examiner

*Primary Examiner* — Judy Nguyen
*Assistant Examiner* — Nguyen Q Ha

(57) ABSTRACT

Hard imaging devices and hard imaging methods are described. According to one embodiment, a hard imaging device includes an image engine configured to provide a marking agent upon media to form hard images, and a media sensing system configured to sense the media and to provide at least one signal comprising information indicative of a direction of grain of the media responsive to the sensing of the media, and processing circuitry configured to receive the at least one signal provided by the media sensing system and to control an operation of the hard imaging device using the information indicative of the direction of the grain of the media of the at least one signal.

19 Claims, 3 Drawing Sheets

HARD IMAGING DEVICES AND HARD IMAGING METHODS

FIELD OF THE DISCLOSURE

Aspects of the disclosure relate to hard imaging devices and hard imaging methods.

BACKGROUND OF THE DISCLOSURE

Paper grain may be defined as an anisotropic material property in paper due to a tendency for paper fiber orientation to align with a web processing direction during manufacture. In addition, residual stresses induced from the drying steps in processing also contribute to anisotropy. For example, in web machine processing of paper, fibers of paper sit upon a substrate such as a screen, additives are added and thereafter the fibers and additives are dried. The substrate may be removed and the structure of fibers which forms the paper may be wound onto rolls. In this illustrative process, strains are placed upon the paper in the web machine direction which tend to result in the fibers being aligned with the web machine direction as opposed to the cross web direction. As discussed below according to one embodiment, hard imaging methods and apparatus are described for determining a direction of the grain of the media.

SUMMARY

According to some aspects of the disclosure, hard imaging devices and hard imaging methods are described.

According to one aspect, a hard imaging device comprises an image engine configured to provide a marking agent upon media to form hard images, and a media sensing system configured to sense the media and to provide at least one signal comprising information indicative of a direction of grain of the media responsive to the sensing of the media, and processing circuitry configured to receive the at least one signal provided by the media sensing system and to control an operation of the hard imaging device using the information indicative of the direction of the grain of the media of the at least one signal.

According to another aspect, a hard imaging method comprises using a hard imaging device, forming hard images including providing a marking agent upon media, using the hard imaging device, determining a direction of grain of the media, and using the direction of the grain of the media, controlling an operation of the hard imaging device with respect to the forming hard images.

Other embodiments and aspects are described as is apparent from the following discussion.

DETAILED DESCRIPTION

Some embodiments of the present disclosure are described with respect to hard imaging (i.e., formation of images upon media such as paper or other suitable substrate). As discussed above, for some types of media (e.g., paper media), fibers of the media may be generally aligned in a common direction during manufacture of the media. However, depending upon how the media is cut, the long grain of the media may be aligned (i.e., parallel) with a process direction of the hard imaging device (e.g., the process direction is parallel with a direction of movement of media moving along a media path of the hard imaging device) or a scan direction of the hard imaging device (e.g., the scan direction is perpendicular to a direction of movement of media moving along the media path of the hard imaging device) in illustrative embodiments. As discussed below with respect to at least one embodiment, a direction of grain of media may be determined and operations of the hard imaging device performed with respect to hard imaging upon the media may be implemented and/or adjusted according to the direction of the grain of the media. In one embodiment, apparatus and methods are described which detect a direction of grain of media and the information regarding the direction of the grain may be used to control one or more operation of the hard imaging device with respect to the formation of hard images. Additional embodiments are described below.

Figure 1:
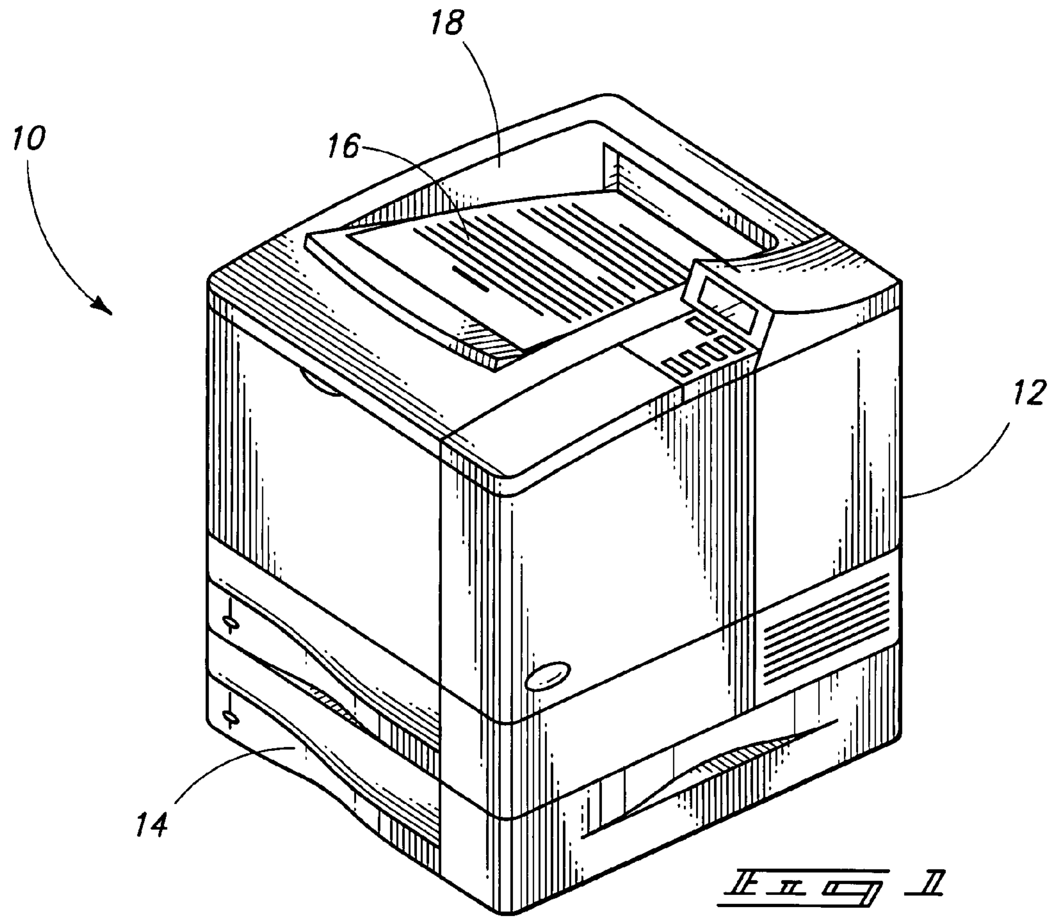
FIG. 1 is an illustrative representation of a hard imaging device according to one embodiment.

Referring to FIG. 1, one embodiment of a hard imaging device 10 configured to form hard images upon media is depicted as a printer. Some illustrative configurations of device 10 implemented as a printer include laser, inkjet, impact and liquid ink based presses (e.g., Indigo press available from Hewlett-Packard Company) although other configurations are possible. Hard imaging device 10 may be arranged in other hard imaging configurations, such as a copier, facsimile, or multi-purpose peripheral, in other embodiments. Hard imaging device 10 includes a housing 12 and an input media tray 14 configured to store a supply a media 16 to be used for hard imaging in the depicted embodiment. Media 16 having hard images thereon produced by hard imaging device 10 is shown in an output tray 18 in the illustrated embodiment.

Figure 2:
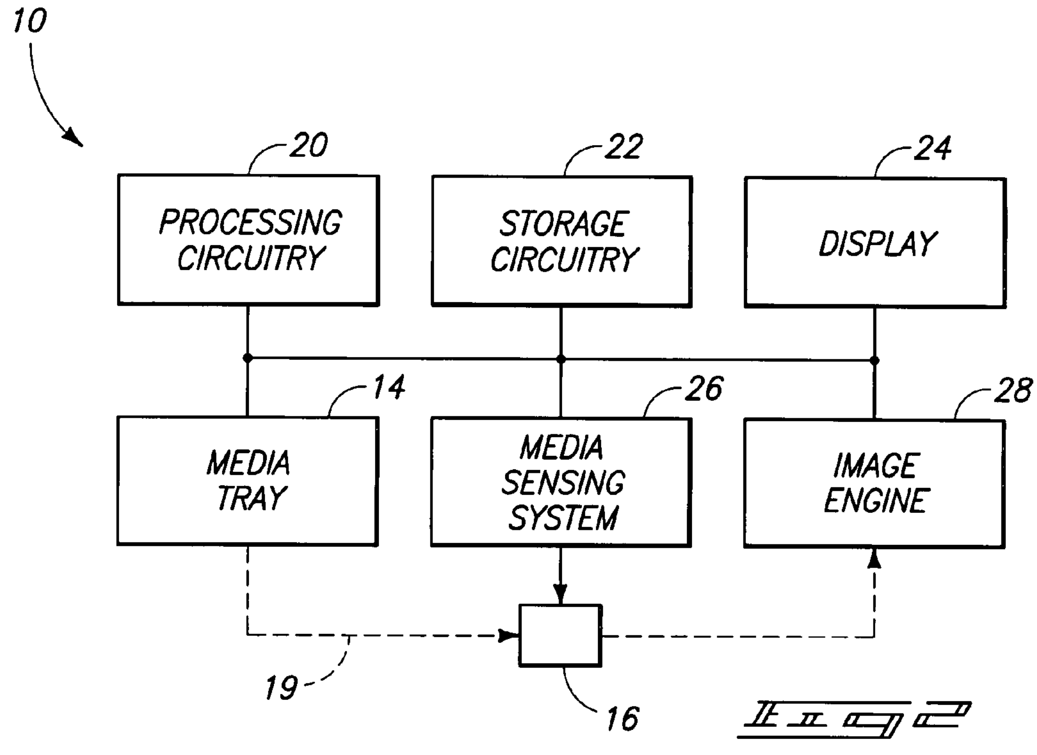
FIG. 2 is a functional block diagram of a hard imaging device according to one embodiment.

Referring to FIG. 2, components of one embodiment of hard imaging device 10 are shown. The depicted arrangement includes processing circuitry 20, storage circuitry 22, a display 24, a media tray 14, a media sensing system 26 and an image engine 28 which may be provided within housing 12 (FIG. 1) in one embodiment.

Media tray 14 is configured to hold a supply of one or more type of media 16 to be imaged upon. Media 16 may be pulled from the media tray 14 and travel along a media path 19 within housing 12 during hard imaging by device 10. Media path 19 may correspond to a path which media 16 travels along within hard imaging device 10 from media tray 14 to image engine 28 and output tray 18 (FIG. 1) in one embodiment.

In one embodiment, processing circuitry 20 is arranged to process data, control data access and storage, issue commands, and control other desired operations of hard imaging device 10. Processing circuitry 20 may access image data corresponding to content of images to be hard imaged by device 10 and may control image engine 28 to form the images using the image data. Processing circuitry 20 may comprise circuitry configured to implement desired programming provided by appropriate media in at least one embodiment. For example, the processing circuitry 20 may be implemented as one or more of a processor and/or other structure configured to execute executable instructions including, for example, software and/or firmware instructions, and/or hardware circuitry. Exemplary embodiments of processing circuitry 20 include hardware logic, PGA, FPGA, ASIC, state machines, and/or other structures alone or in combination with a processor. These examples of processing circuitry 20 are for illustration and other configurations are possible.

The storage circuitry 22 is configured to store programming such as executable code or instructions (e.g., software and/or firmware), electronic data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry 20 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 22 described above and/or communicated via a network or other transmission media and configured to control appropriate processing circuitry 20. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

Display 24 is configured to depict information for observation by the user. For example, display 24 may generate human perceptible messages for communication to an operator in one embodiment.

Media sensing system 26 is configured to sense media 16 in one embodiment. In some embodiments, media sensing system 26 may be positioned at an appropriate location to sense media 16 within media tray 14 or at suitable locations along media path 19. Media sensing system 26 may be positioned along media path 19 upstream of image engine 28 to provide information regarding the direction of grain of a sheet of media 16 prior to hard imaging upon the sheet of media 16 by image engine 28 in one embodiment. In another embodiment, a sheet of media 16 may be passed through device 10 (e.g., with or without imaging thereon) during calibration to determine the direction of the grain of media 16. Different methods may be used for media sensing system 26 to sense media 16 in other embodiments.

Media sensing system 26 is configured in one embodiment to provide a signal indicative of a direction of grain (e.g., long grain direction) of the media 16 responsive to the sensing of the media 16. The signal including information regarding the direction of the grain may be communicated to processing circuitry 20 which may control an operation of the hard imaging device 10 using the determined direction of the grain as described in further detail below.

Image engine 28 is configured to form hard images upon the media 16 in one embodiment. The formed hard images may include content of image data processed by processing circuitry 20. Image engine 28 may provide a marking agent upon media 16 to form hard images in illustrative configurations. For example, in an ink jet arrangement of hard imaging device 10, image engine 28 may provide a marking agent in the form of droplets of one or more color of ink upon media 16 to form hard images. In an electrophotographic arrangement of hard image device 10, image engine 28 may provide a marking agent in the form of dry toner or liquid ink of one or more color upon media 16. Other embodiments of image engine 28 are possible.

Figure 3:
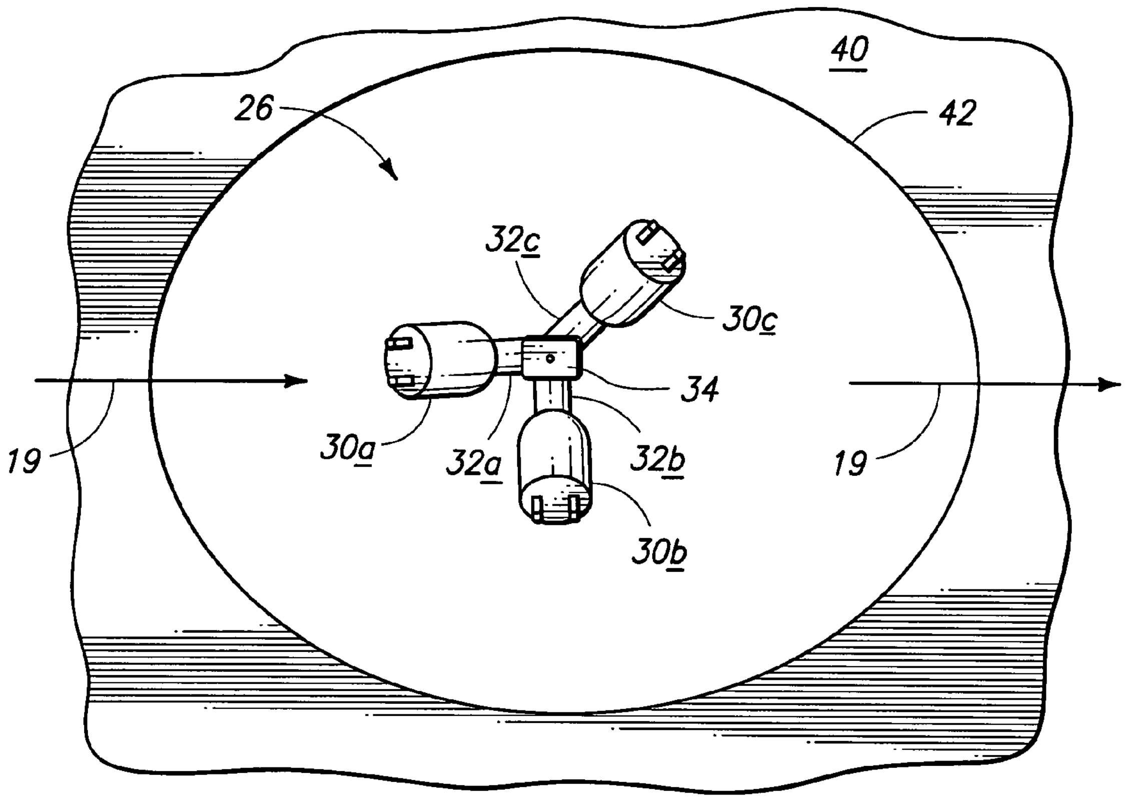
FIG. 3 is a plan view of a media sensing system according to one embodiment.

Referring to FIG. 3, one exemplary embodiment of a media sensing system 26 configured to sense media 16 (media 16 is not shown in FIG. 3) is shown. In one embodiment as mentioned above, media sensing system 26 is configured to sense and provide information indicative of a direction of grain of the media 16. In the embodiment of FIG. 3, media sensing system 26 is configured to monitor reflectivity of light from media 16 in a plurality of directions (e.g., process and scan directions which are parallel and perpendicular, respectively, to a direction of movement of media traveling along media path 19 in one example) to provide the information indicative of the direction of the grain. Media sensing system 26 is configured to provide signals comprising intensity information corresponding to reflected light in plural directions in the embodiment of FIG. 3.

The media sensing system 26 includes a plurality of light sources 30*a*, 30*b*, 30*c* and a light sensing device 34 in the depicted embodiment. Light sources 30*a*, 30*b*, 30*c* are configured to emit respective light beams 32*a*, 32*b*, 32*c* and may be configured as light emitting diodes (LEDs) in one implementation. Although three light sources 30*a*, 30*b*, 30*c* are shown in FIG. 3, other numbers of light sources may be used in other configurations of media sensing system 26. For example, in one alternative embodiment, one or more of the light sources 30*a*, 30*b*, 30*c* may be omitted.

The illustration of FIG. 3 is a plan view wherein the media sensing system 26 is positioned over a substrate 40 adjacent to media path 19. A sheet of media may ride upon substrate 40 intermediate substrate 40 and media system 26 in one embodiment. Light sources 30*a*, 30*b*, 30*c* may be configured in one embodiment to emit respective light beams 32*a*, 32*b*, 32*c* at relatively low angles with respect to a surface of the sheet of media (e.g., light sources 30*a*, 30*b*, 30*c* may all emit light beams 32*a*, 32*b*, 32*c* at the same angle within a range of 0 to 45 degrees in one example). The downwardly emitted light beams 32*a*, 32*b*, 32*c* are reflected upwardly by the sheet of media and are received by light sensing device 34 such as a photodiode in one embodiment. Light sensing device 34 may be positioned at a central location of light sources 30*a*, 30*b*, 30*c* and be arranged to sense light received in a direction substantially normal to the sheet of media 16 in one embodiment.

In one embodiment, substrate 40 is a material having reduced or minimal grain to reduce interference thereof with the readings of the media. For example, substrate 40 may be configured as a black sheet of plastic or polished stainless steel. An aperture 42 may be provided in substrate 40 and aligned opposite media sensing system 26 such that light passing through a sheet of media passes through the aperture 42 and is not reflected upwardly by substrate 40 which may otherwise interfere with readings by light sensing device 34.

In the described embodiment, two light sources 30*a*, 30*b* are arranged in orthogonal process and scan directions and are configured to emit respective light beams 32*a*, 32*b* of substantially the same intensity in the process and scan directions of the media path 19. Light sensing device 34 may generate respective signals corresponding to intensity of light received from light beams 32*a*, 32*b* reflected by a sheet of media riding upon substrate 40 in the respective process and scan directions in one embodiment. The respective signals are indicative of the direction of the grain of media 16 and may be processed by processing circuitry 20 to determine the long grain and short grain directions of the sheet of media traveling along paper path 19. A greater amount of light is reflected by a light beam parallel to the short grain direction of the media compared to an amount of light reflected by a light beam parallel to the long grain direction of the media. Accordingly, a signal generated by light sensing device 34 having the larger intensity responsive to one of light beams 32*a*, 32*b* will indicate the short grain direction of the media parallel to the direction of the one of the light beams 32*a*, 32*b* in one embodiment.

As mentioned above, one or more of light sources 30*a*, 30*b*, 30*c* may be omitted. In one embodiment, light source 30*c* is provided to enable verification of readings of light beams 32*a*, 32*b*. For example, output from light sensing device 34 responsive to light beam 32*c* should indicate an intensity value between intensity values resulting from light beams 32*a*, 32*b* to verify proper sensing operations of system 26. In one embodiment, light sources 30*a*, 30*b*, 30*c* may be sequentially powered to enable light sensing device 34 to provide signals corresponding to light received from respective ones of the light sources 30*a*, 30*b*, 30*c*. Other embodiments are possible and may, for example, include different orientations of the components of the media sensing system 26 and/or omission of light source 32*c*.

In another embodiment, media sensing system 26 may include one light source and a plurality of light sensing devices. For example, the light sensing device 34 of FIG. 3 may be replaced by a light source and the light sources 30*a*, 30*b*, 30*c* may be replaced by respective light sensing devices. The light source of this embodiment may be configured to emit a light beam in a direction towards the media which is substantially normal to the surface of the media. Light sensing devices may be positioned and configured similarly to the arrangement of light sources 30*a*, 30*b*, 30*c* to receive low angle light emitted by the light source and reflected in respective ones of the plural directions by a sheet of media in one embodiment. For example, two of the light sensing devices may be aligned with and configured to receive light reflected from the media in orthogonal directions corresponding to the process and scan directions and perhaps at least one additional intermediate direction (e.g., position corresponding to light source 30*c*) as shown in FIG. 3 for verification operations.

The above described embodiments describe arrangements of system 26 wherein light which was reflected from media 16 is used to determine the orientation of the grain of the media 16 due to texturing effects of the media 16 (i.e., corresponding to a bias in the orientation of the paper fibers) upon impinging light. In other embodiments, light sensing devices and light sources of the above-described illustrative arrangements may be provided at opposite sides of the media 16 to provide similar monitoring of the texturing effects of the media for determining the orientation of the grain by sensing light (e.g., collimated) passing through the media 16. Other embodiments are possible.

Signals outputted by one or more of the light sensing devices 34 may be provided to processing circuitry 20 as mentioned above for processing. The above-described texturing effect can be measured by processing circuitry 20 using the signals outputted by media sensing system 26 and indicative of the intensity of light from a sheet of media 16 in orthogonal directions corresponding to the process direction and the scan direction. As mentioned above, light from a sheet of media 16 in a direction parallel to the short or cross grain direction has a greater intensity value compared with light from a sheet of media in a direction parallel to the long grain direction of the media 16 (i.e., the direction of the grain of the media 16). In one embodiment, processing circuitry 20 may calculate a ratio of the signals corresponding to the orthogonal directions and determine the direction of the grain of the sheet of media.

Figure 4:
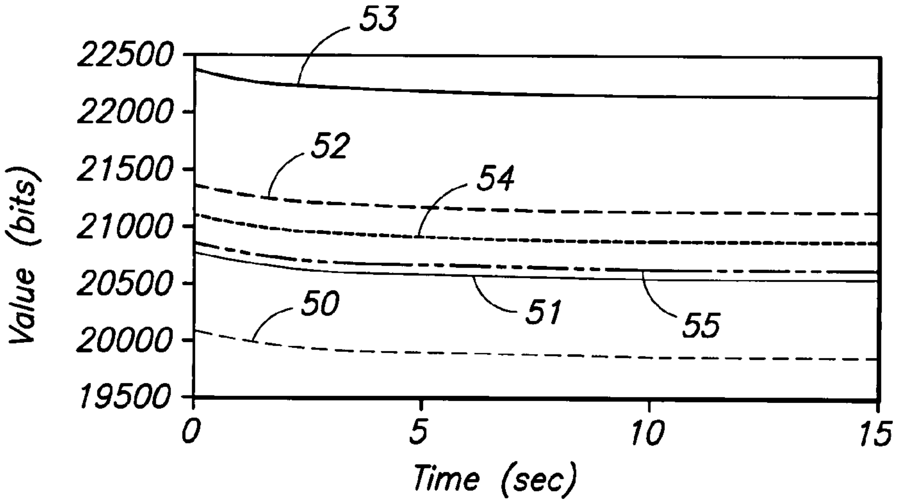
FIG. 4 is a graphical representation of measurement data of grain of various types of media according to one embodiment.

Referring to FIG. 4, a graphical representation of intensity information of signals outputted from media sensing system 26 is shown for different types of media 16. In the illustrated graph, intensity information is plotted against the y axis and time is plotted against the x axis for multipurpose media, recycled media, and photo media. In particular, line 50 corresponds to a long grain direction of multipurpose media, line 51 corresponds to a short grain direction of multipurpose media, line 52 corresponds to a long grain direction of recycled media, line 53 corresponds to a short grain direction of recycled media, line 54 corresponds to a short grain direction of photopaper media and line 55 corresponds to a long grain direction of photopaper media. Other types of media may be used and analyzed using media sensing system 26 in other embodiments. In FIG. 4, the intensity values drop with respect to time due to temperature changes during operation of the light sources configured as LEDs in one embodiment.

Figure 5:
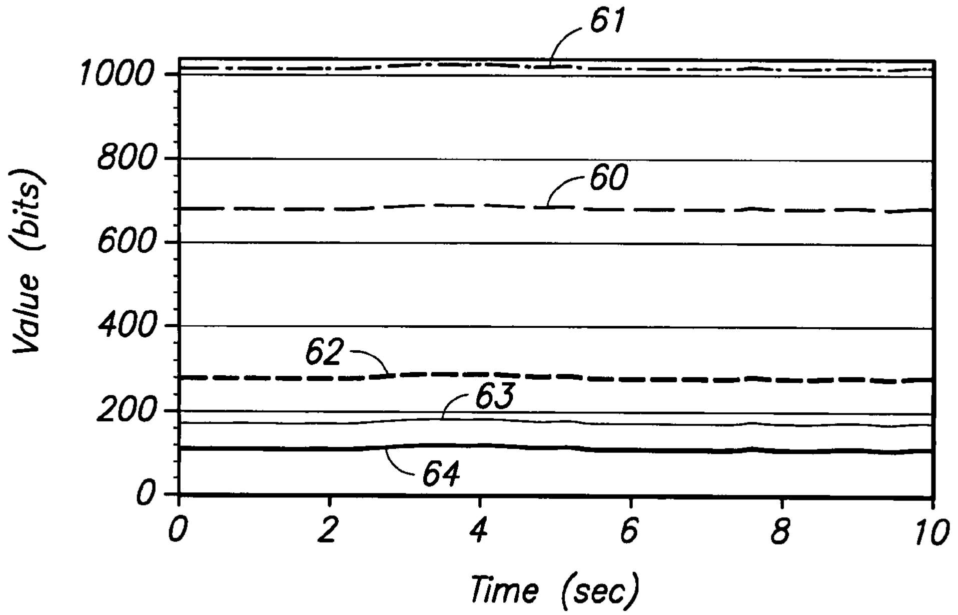
FIG. 5 is a graphical representation of difference measurement data grain of various types of media according to one embodiment.

Referring to FIG. 5, another graphical representation of intensity information of signals outputted from media sensing system 26 is shown as an orthogonal difference measurement for different types of media 16. In FIG. 5, line 60 corresponds to a difference measurement for multipurpose media, line 61 corresponds to a difference measurement for recycled media, line 62 corresponds to a difference measurement for photopaper media, line 63 corresponds to a difference measurement for photopaper media and line 64 corresponds to a difference measurement for HP Presentation media. As shown, the results of difference measurement (FIG. 5) are substantially flat showing that difference measurements negate transient output due to LED light output instability as temperature of the light sources changes over time (FIG. 4).

As illustrated in FIG. 5, there is a direct correlation between physical media grain and sensor output by taking the difference between illuminated orthogonal directions. Media with high anisotropy (e.g., recycled media) has an increased optical difference compared with lower anisotropy media (e.g., HP Presentation media) with minimal grain. The difference results are larger for types of media having increased grain compared with types of media having minimal grain.

Processing circuitry 20 is configured to control operations of device 10 using information from media sensing system 26 regarding grain of the media 16 being imaged upon. For example, cut sheet media of unknown grain direction may be a source of cockle issues (e.g., localized deformation in the paper which may extend out of the plane of the paper) in relatively high throughput inkjet configurations of device 10. Operations of device 10 may be configured corresponding to the direction of the grain of the media 16 to reduce or minimize hard imaged media cockle. In addition, some sheet operations, such as folding, perfect binding or trimming, are highly dependent on media grain to attain improved quality results.

Imaging in conventional imaging applications, which operate independent of knowledge of orientation of grain, may be negatively impacted by having to account for grain directions of unknown orientation. For example, with inkjet printing devices, it may be desirable to subject media having grain oriented in the scan direction to additional drying cycles (compared with media having grain oriented in the process direction) to evaporate an additional amount of water from the media to reduce cockling. Accordingly, printing speeds of inkjet printers may be slowed to account for media having grain of unknown orientation to enable additional drying cycles to evaporate water to yield stable media. Accordingly, the throughput of such a device would be reduced to implement the additional drying cycles for media having grain oriented in both process and scan directions although such are typically not needed for media having grain oriented in the process direction as mentioned above.

According to an embodiment of the disclosure, hard imaging device 10 may utilize the information regarding the direction of the grain of the media 16 to control operations of device 10. Additional operations may be performed and/or operations may be modified upon detection of media 16 having grain oriented in the scan direction compared with media 16 having grain oriented in the process direction to reduce cockling or curling. In one example described above, heating of media can be controlled (e.g., additional drying cycles may be performed by image engine 28) to evaporate an increased amount of water in inkjet printing of media 16 having grain oriented in the scan direction. In another example, the processing circuitry 20 may control operations regarding the provision of the marking agent upon the media (e.g., the processing circuitry 20 may control the formation of ink droplets having different amounts of ink and/or water corresponding to the orientation of the grain of the media 16 to reduce cockling). In a laser based imaging example, a processing speed of a fuser of image engine 28 may be adjusted responsive to the detection of the orientation of the grain of media. In another example, de-curling operations, such as passing media 16 having grain oriented in the scan direction through de-curling rollers (or perhaps providing for additional passages through the rollers), may be performed to reduce cockling.

In another example, it may be desirable for operators to know the orientation of the grain so appropriate action may be taken prior to imaging (e.g., prior to imaging in a desktop publishing application). More specifically, it may be desirable to orient media in a given direction prior to imaging to yield improved results. In some specific examples, it may be desired to orient the media such that the grain is in the direction in which the media will be cut, folded or bound. According to one implementation, the processing circuitry 20 of the hard imaging device 10 may detect the orientation of the grain of the media and may control an operation of the device 10 if the orientation is not in the appropriate direction for the imaging to be performed. In one example, the processing circuitry 20 may access information regarding the imaging to be performed (e.g., cutting, folding, binding, etc.) and control the generation of a human perceptible message by display 24 to request the operator to re-align the direction of the grain of the media 16 in the appropriate direction for the imaging and finishing to be performed if such is not properly aligned.

The above are examples of illustrative operations of the hard imaging device 10 which may be performed and/or modified using information provided by the media sensing system 26 regarding the detected direction of the grain of the media 16. Other operations of device 10 may be performed and/or modified in other configurations, implementations or applications of the hard imaging device 10 in other embodiments.

Figure 6:
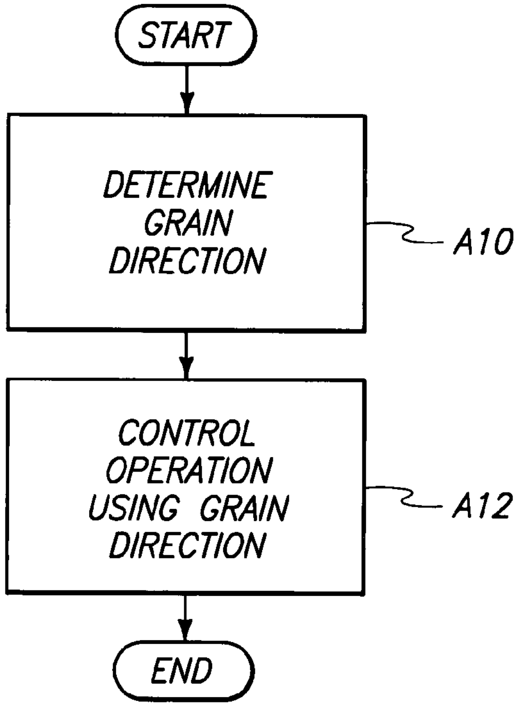
FIG. 6 is a flow chart of a method performed by a hard imaging device according to one embodiment.

Referring to FIG. 6, an example of a method which may be performed by hard imaging device 10 using information regarding the direction of grain of the media is shown. Processing circuitry 20 of the hard imaging device 10 may implement the depicted method in one embodiment. Other methods which include more, less and/or additional acts are possible in other embodiments.

At an Act A10, the processing circuitry may access the signals outputted by the media sensing system and may process the signals to determine the direction of the grain of the media to be imaged upon. As mentioned above, a short grain direction of media typically reflects additional light compared with a long grain direction of the media and accordingly the signal having the greater intensity may be used to indicate the direction of the grain in one embodiment.

At an Act A12, the processing circuitry may control an operation of the hard imaging device with respect to hard imaging if appropriate. In one example, the processing circuitry may adjust an operation of the image engine using the grain direction information. In another example, the processing circuitry may control the communication of appropriate messages to an operator based upon the imaging to be performed. Hard imaging upon the media may be performed by the control of the processing circuitry in accordance with the detected direction of the grain of the media. Other operations may be controlled by the processing circuitry using the grain direction information in other embodiments.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure The protection sought is not to be limited to the disclosed embodiments, which are given by way of example only, but instead is to be limited only by the scope of the appended claims.

What is claimed is:

1. A hard imaging device comprising:

an image engine to provide a marking agent upon media to form hard images; and a media sensing system comprising, a plurality of light sources to emit respective light beams at angles with respect to a surface of the sheet of media, wherein a first one of the plurality of light sources is to emit a light beam in a first direction and a second one of the plurality of light sources is to emit a light beam in a second direction, wherein the first direction is perpendicular to the second direction; and a light sensing device to receive light emitted from the plurality of light sources and to provide at least one signal indicative of a direction of grain of the media responsive to the received light, wherein the light sensing device is positioned at a substantially central location with respect to the plurality of light sources and to receive light in a direction that is substantially normal to the sheet of media; and processing circuitry to receive the at least one signal provided by the media sensing system and to control an operation of the hard imaging device using the information indicative of the direction of the grain of the media of the at least one signal.

2. The device of claim 1 wherein the media sensing system is configured to sense the media in a media path of the hard imaging device.

3. The device of claim 1 wherein the media sensing system is configured to monitor reflectivity of light from the media in a plurality of directions to provide the at least one signal.

4. The device of claim 3 wherein the media sensing system is configured to monitor intensity of light reflected from the media in the plurality of directions to provide the at least one signal.

5. The device of claim 3 wherein the first direction is parallel and the second direction perpendicular to a direction of movement of the media in the media path.

6. The device of claim 5 wherein a third one of the plurality of light sources is to emit a light beam in a third direction that is to enable verification of correct operation of the media sensing system.

7. The device of claim 1 wherein the first direction is a process direction and the second direction is a scan direction of a media path of the hard imaging device, wherein the process direction is parallel with a direction of movement of the media moving along a media path.

8. The device of claim 1 wherein the operation of the hard imaging device includes heating of the media.

9. The device of claim 1 wherein the operation of the hard imaging device includes provisioning of the marking agent upon the media.

10. The device of claim 1 wherein the operation of the hard imaging device includes generation of a human perceptible message regarding changing an orientation of the media in a media path of the hard imaging device.

11. A hard imaging device comprising:

processing means for accessing image data of content to be formed as a hard image upon media;

media sensing means for monitoring light in a process direction with respect to the media and for monitoring light in a scan direction with respect to the media, wherein the scan direction is perpendicular with respect to the process direction, and wherein the media sensing means comprises, a plurality of light sources to emit respective light beams at angles with respect to a surface of the sheet of media, wherein a first one of the plurality of light sources is to emit a light beam in the process direction and a second one of the plurality of light sources is to emit a light beam in the scan direction; and a light sensing device to receive light emitted from the plurality of light sources and to provide the at least one signal responsive to the received light, wherein the light sensing device is positioned at a substantially central location with respect to the plurality of light sources and to receive light in a direction that is substantially normal to the sheet of media;

wherein the processing means further comprises means for analyzing results of the monitoring of the light in the process direction and the monitoring the light in the scan direction to ascertain information indicative of an orientation of a grain of the media and for controlling an operation of the hard imaging device with respect to forming of hard images upon the media using the information indicative of the orientation of the grain of the media.

12. The device of claim 11 wherein the plurality of light sources comprise light emitting diodes.

13. A hard imaging method comprising:

using a hard imaging device, forming hard images including providing a marking agent upon media;

using the hard imaging device, emitting a first light beam in a first direction at an angle with respect to a surface of the media from a first light source, emitting a second light beam in a second direction at an angle with respect to the surface of the media from a second light source, wherein the first direction is perpendicular to the second direction;

receiving light emitted from the first and second light sources and reflected from the surface of the media into a light sensing device, wherein the light sensing device is positioned at a substantially central location with respect to the first and second light sources and to receive light in a direction that is substantially normal to the media; and generating at least one signal responsive to the received light;

determining a direction of grain of the media based upon the generated at least one signal; and using the direction of the grain of the media, controlling an operation of the hard imaging device with respect to the forming hard images.

14. The method of claim 13 wherein further comprising:

emitting a third light beam in a third direction at an angle with respect to the surface of the media from a third light source; and receiving light emitted from the third light source and reflected from the surface of the media into the light sensing device, the light emitted from the third light source and reflected from the surface of the media is to enable verification of correct operation of the media sensing system.

15. The method of claim 13 wherein the first direction corresponds to a process direction and the second direction corresponds to a scan direction of the hard imaging device, and wherein the process direction is parallel with a direction of movement of the media moving along a media path.

16. The method of claim 14 further comprising moving the media along a paper path of the hard imaging device, and wherein the receiving the light comprises receiving the light in a process direction and a scan direction of the media path.

17. The method of claim 13 wherein the controlling the operation comprises controlling heating of the media.

18. The method of claim 13 wherein the controlling the operation comprises controlling provision of the marking agent upon the media.

19. The method of claim 13 wherein the controlling the operation comprises controlling generation of a human perceptible message regarding changing an orientation of the media in a paper path of the hard imaging device.

* * * * *